United States Patent
Bradish et al.

(10) Patent No.: US 10,846,720 B1
(45) Date of Patent: Nov. 24, 2020

(54) SYSTEMS AND METHODS FOR CREATING PATTERN AWARENESS AND PROXIMAL DEDUCTION OF WIRELESS DEVICES

(71) Applicant: The Wireless Registry, Inc., Washington, DC (US)

(72) Inventors: Stillman Bradish, Washington, DC (US); Srdjan Marinovic, Washington, DC (US); Eric Stanculescu, Washington, DC (US)

(73) Assignee: The Wireless Registry, Inc., Washington, DC (US)

( * ) Notice: Subject to any disclaimer, the term of this patent is extended or adjusted under 35 U.S.C. 154(b) by 208 days.

(21) Appl. No.: 16/035,626

(22) Filed: Jul. 14, 2018

Related U.S. Application Data

(60) Provisional application No. 62/532,988, filed on Jul. 14, 2017.

(51) Int. Cl.
  *G06Q 30/02* (2012.01)
  *H04W 4/08* (2009.01)
  *H04W 4/02* (2018.01)

(52) U.S. Cl.
  CPC ..... *G06Q 30/0205* (2013.01); *G06Q 30/0254* (2013.01); *H04W 4/023* (2013.01); *H04W 4/08* (2013.01)

(58) Field of Classification Search
  CPC .......... G06Q 10/00–50/00; H04W 4/00–92/00
  USPC ............................................. 705/7.121–7.42
  See application file for complete search history.

(56) References Cited

U.S. PATENT DOCUMENTS

| | | | | |
|---|---|---|---|---|
| 8,161,178 B2* | 4/2012 | Gonsalves | ........ | H04L 29/06027 709/231 |
| 8,311,845 B2* | 11/2012 | Vengroff | ................ | G06Q 30/02 705/1.1 |
| 8,423,003 B2* | 4/2013 | Sarukkai | ................. | H04M 3/02 455/414.3 |
| 8,581,707 B2* | 11/2013 | Bucci | ..................... | G08C 17/02 340/10.42 |
| 8,805,339 B2* | 8/2014 | Ramer | ................... | H04H 60/46 455/414.1 |
| 9,225,795 B2* | 12/2015 | Mostafa | ................... | H04L 67/32 |
| 9,449,334 B1* | 9/2016 | Abou-Rizk | ........ | H04N 21/2662 |
| 9,749,849 B1* | 8/2017 | Bradish | ................. | H04L 67/025 |
| 9,756,608 B1* | 9/2017 | Bradish | ................... | H04W 4/06 |
| 10,085,122 B2* | 9/2018 | Howe | ................... | H04W 64/00 |
| 10,116,899 B2* | 10/2018 | Delorenzi | ............... | H04W 4/06 |
| 10,375,677 B2* | 8/2019 | Zhang | ................. | H04L 61/2069 |
| 2005/0043023 A1* | 2/2005 | Romeo | ................... | H04L 41/00 455/423 |
| 2005/0064875 A1* | 3/2005 | Gonsalves | ............. | G06Q 30/04 455/454 |
| 2006/0190330 A1* | 8/2006 | Tollinger | ........... | G06Q 30/0226 705/14.14 |
| 2008/0059300 A1* | 3/2008 | Hamoui | ................. | G06Q 30/02 705/14.64 |

(Continued)

*Primary Examiner* — Alan S Miller
(74) *Attorney, Agent, or Firm* — Law Office of Michael Antone; Michael Antone

(57) ABSTRACT

Systems and methods for creating pattern awareness and proximal deduction of wireless devices is disclosed. The methods allow wireless awareness among a plurality of wireless signals and the ability of assigning meaning to a group of wireless signals associated with an observing WED, or wireless signal detector and take action based on the meaning.

20 Claims, 5 Drawing Sheets

(56) References Cited

U.S. PATENT DOCUMENTS

| | | | | |
|---|---|---|---|---|
| 2009/0195402 | A1* | 8/2009 | Izadi | H04W 76/14 340/686.6 |
| 2009/0234711 | A1* | 9/2009 | Ramer | G06F 16/635 705/14.66 |
| 2010/0211476 | A1* | 8/2010 | Gonsalves | G06Q 30/0601 705/26.1 |
| 2012/0089996 | A1* | 4/2012 | Ramer | H04H 60/46 725/14 |
| 2012/0173367 | A1* | 7/2012 | Soroca | G06Q 30/0267 705/26.3 |
| 2012/0173379 | A1* | 7/2012 | Soroca | G06Q 30/02 705/26.3 |
| 2013/0111554 | A1* | 5/2013 | Sposato | H04W 12/003 726/4 |
| 2013/0132515 | A1* | 5/2013 | Mostafa | H04N 21/4755 709/217 |
| 2014/0006785 | A1* | 1/2014 | Shaliv | H04L 9/088 713/170 |
| 2015/0154431 | A1* | 6/2015 | Skaaksrud | G16H 10/60 340/10.1 |
| 2015/0235275 | A1* | 8/2015 | Shah | G06Q 30/0269 705/14.66 |
| 2019/0132815 | A1* | 5/2019 | Zampini, II | G06Q 50/06 |
| 2019/0191283 | A1* | 6/2019 | Bhanot | H04B 17/27 |

* cited by examiner

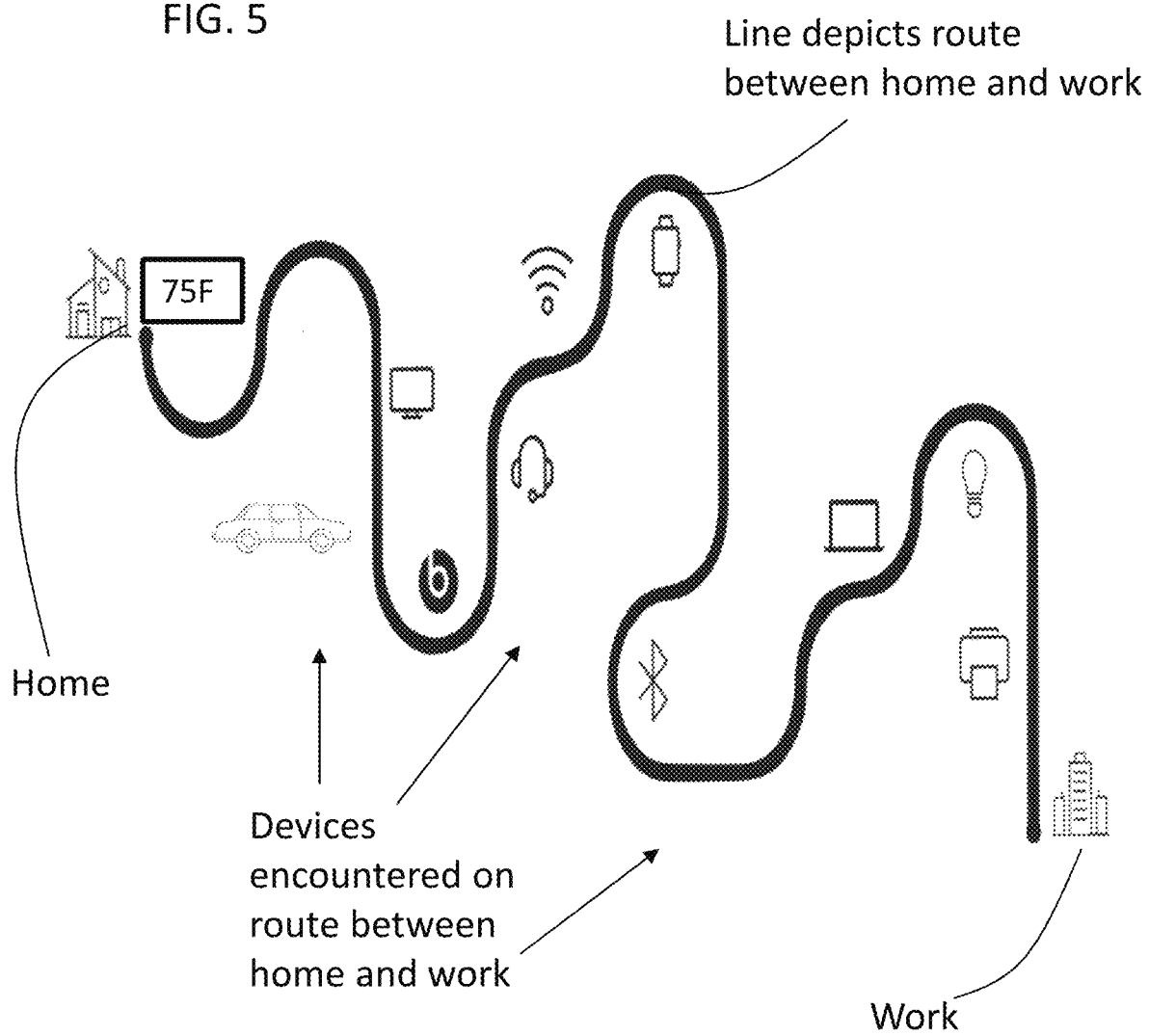

SYSTEMS AND METHODS FOR CREATING PATTERN AWARENESS AND PROXIMAL DEDUCTION OF WIRELESS DEVICES

CROSS-REFERENCE TO RELATED APPLICATIONS

This non-provisional patent application claims the benefit of and priority to U.S. Provisional Patent Application No. 62/532,988, filed Jul. 14, 2018, which is incorporated herein by reference in its entirety.

TECHNICAL FIELD

The present disclosure relates in general to wireless networking and more specifically to methods and systems for pattern awareness and proximal deduction of wireless enabled devices.

BACKGROUND OF THE INVENTION

Wireless Enabled Devices (WEDs) have seen increasingly widespread use in recent years as consumers have shown a growing interest in accessing content wirelessly. Consumers may use phones, tablets, laptops, and many other devices in a variety of environments and situations, and as the number of users may grow so may the challenges faced in providing a suitable service to each user.

The mobility of wireless devices brings unprecedented opportunities to provide services to users along with corresponding complexity in the networks capabilities required to deliver new and better services. Accordingly, there is a continuing need for networks, systems, devices, and strategies that address the challenges and opportunities presented by expanding use of wireless and wired communications technology.

BRIEF SUMMARY OF THE INVENTION

Devices, systems, networks, and methods of the present invention are disclosed that address the aforementioned challenges and opportunities using various hardware and/or software implementations. In various embodiments, systems and methods for using a wireless name system as a platform for a plurality of wireless applications are disclosed. According to various embodiments, a wireless ID system may include one or more unconnected or connected wireless enabled devices (WEDs) which may receive or send various wireless signals, including various transmissions, beacon messages, etc. that may include a network information string; an information string server operatively coupled with an application programming interface (API); and a registry which may include a wireless name system (WNS) for storing network information strings, a wireless name associator (WNA) for storing associated content, and a log datastore for storing API logs.

Computer-implemented methods comprise receiving, by a server, from a wireless signal detector a group of one or more wireless identifiers associated with one or more wireless devices respectively; generating, by the server, a data field based on a common criteria associated with each wireless identifier in the group of identifiers; querying, by the server, a registry datastore for one or more records of each respective wireless identifier from the group of identifiers; updating, by the server, a record of a wireless identifier according to the data field responsive to identifying the record of the wireless identifier; generating, by the server, the record of the wireless identifier according to the data field responsive to determining the record is a new record a new wireless identifier; receiving, by the server, from a second wireless signal detector a query containing the wireless identifier; and transmitting, by the server, one or more data fields of the record of the wireless identifier to the second wireless signal detector in accordance with the query.

Systems of the present invention may include at least one memory and at least one processor that provide a wireless signal data management platform that receives, stores, analyzes, presents and acts upon information received from wireless enabled devices (WEDs). The hardware and software components may be co-located or distributed, physical or virtualized in various configurations to support its function. The platform receives wireless identifiers and information associated with one or more WEDs from wireless signals detected by a wireless signal detector, which may also be a WED. The system identifies device type for each of the WEDs, adds the device type to the information associated with the WEDs, catalogues, and stores the wireless identifiers and information associated with each of the wireless enabled devices and the wireless signal detector in the memory, which may be one or more databases forming a registry. The processors categorize the information derived from the detected wireless signals for each of the wireless enabled devices and the wireless signal detector and identify common criteria among the categorized information from the WEDs. The common criteria may be used to segment the WEDs into groups and subgroups and perform various actions specific to the groups and subgroups based on the particular application of the system. For example, the system may identify common criteria that include the frequency of detection for each of the WEDs by the wireless signal detector, identified device types detected, retail and other locations frequented by the WEDs, geolocation data, and time of day. Based on the criteria, the system may present advertising to groups of users at retail locations, as well as other messaging, such as news, weather, etc. The system may also facilitate analysis of and decision-making based upon consumers' inferred preferences, brand affiliations, interests, and habits, for a variety of uses including advertising uses. The system may enable users to present advertising to WED users via their WED or any other traditional advertising mechanisms, such as in-store and third-party displays. The system may provide a user with a user interface to analyze and visual display the information from WEDs detected by wireless signal detectors owned by the user. The wireless signal detector may be a single purpose detector or a wireless enabled device, such as at least one of smartphones, tablets, laptops, desktop computers, routers, access points, Automated Teller Machines (ATM), and Internet of Things (IoT) devices, etc.

Numerous other aspects, features and benefits of the present disclosure may be made apparent from the following detailed description taken together with the drawing figures.

BRIEF DESCRIPTION OF THE SEVERAL VIEWS OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

FIG. 5 illustrates exemplary paths and WEDs that a user of a WED may encounter in motion.

DETAILED DESCRIPTION OF THE INVENTION

Figure 1:
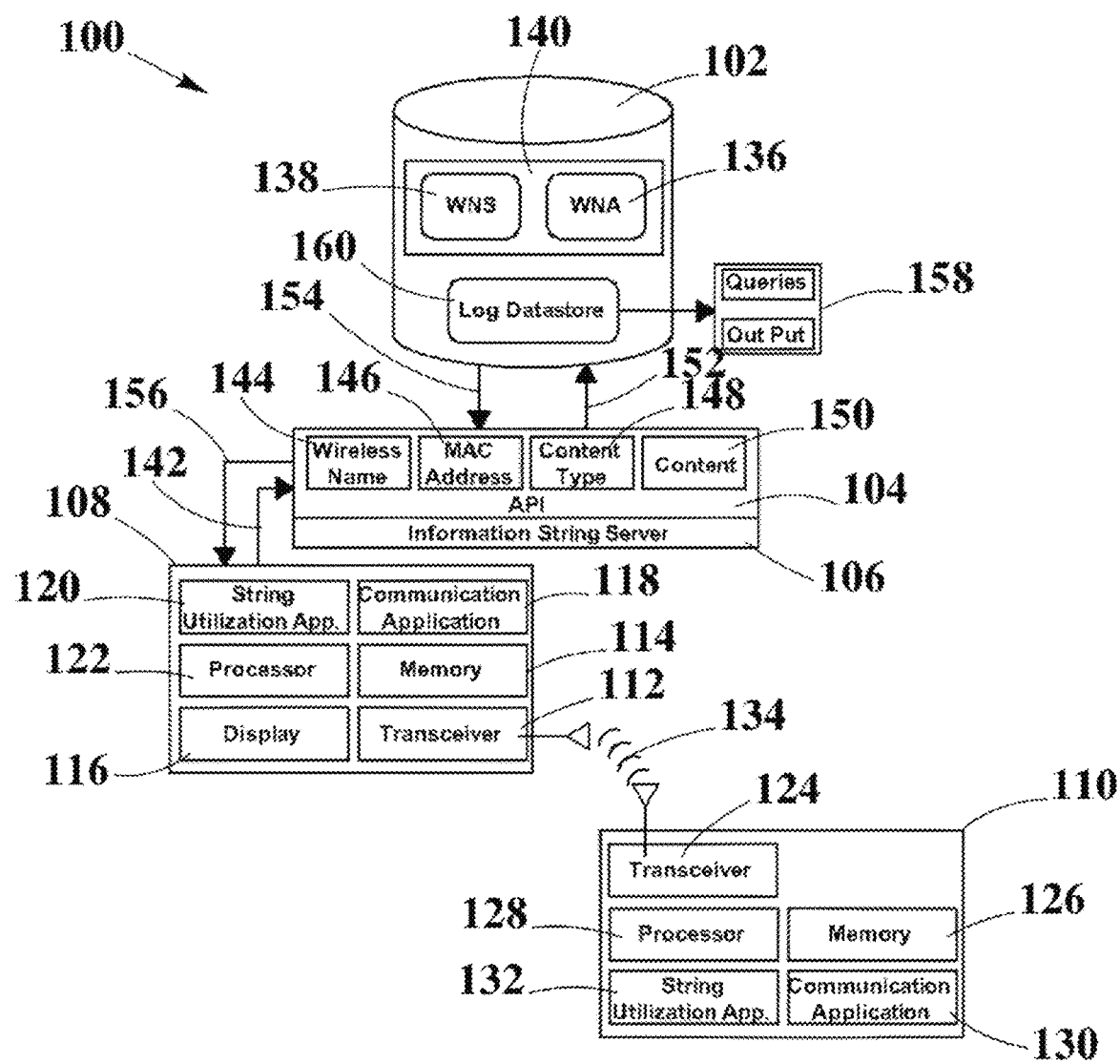
FIG. 1 shows a system architecture diagram for a wireless name system where one or more embodiments of the present disclosure may operate.

The present disclosure is here described in detail with reference to embodiments illustrated in the drawings, which form a part hereof. Other embodiments may be used and/or other changes may be made without departing from the spirit or scope of the present disclosure. The illustrative embodiments described in the detailed description are not meant to be limiting of the subject matter presented here.

As used here, the following terms may have the following definitions:

"Wireless Enabled Device", or "WED" refers to any electronic device able to communicate using one or more suitable wireless technologies. Suitable devices may include client devices in wireless networks, which may send out wireless probe signals in order to detect known Access Points. These may be part of one or more suitable wireless technologies, including Wi-Fi, amongst many others.

"Connected WED" refers to any electronic device connected to a wired or wireless network.

"Unconnected WED" refers to any electronic device capable of establishing a connection with one or more suitable WEDs in a wired or wireless network.

"Registry" refers to any component in a system suitable for storing at least one type of information about one or more other components of the system and/or one or more users of the system.

"Access Point" refers to any device capable of establishing a connection between one or more suitable WEDs within a suitable spatial range and one or more suitable networks.

"Service Set Identifier", or "SSID" refers to any identifier suitable for allowing the identification of a wireless network.

"Action" refers to any activity able to alter the network experience perceived by a WED or a user of a WED.

"Wireless Awareness" refers to the ability of one or more WEDs of identifying one or more wireless signals within a certain area or location and becoming aware of what those signals are or mean, either as an individual or as a group.

"Proximal deduction" refers to the ability of one or more WEDs of being identified by other WEDs without having to transmit any signal.

Although the embodiments described herein make reference to Wi-Fi (802.11) communication protocols and information exchanges, it should be appreciated that in other embodiments any wireless communication technology (i.e., hardware, software, and protocols) may be implemented. Suitable WED hardware may be able to use a wireless signal or technology of any type, such as Bluetooth®, Bluetooth Low-Energy (BLE), Wi-Fi, WiMax, SuperWiFi, LTE systems, LTE Direct, Wi-Fi Direct, or any other wireless signal or technology. Wireless technologies involved in the present invention may be any technology that may wirelessly transmit name strings and wirelessly transmit wireless IDs of any kind (e.g., LTE Direct Expressions and LTE Hardware ID, Universal Unique Identifier (UUID), SSID and MAC). A person having ordinary skill in the art would appreciate that the terms SSID and MAC, as used herein, may be understood as including other wireless technologies, e.g., Bluetooth® names, LTE-Direct Expressions, etc.

FIG. 1 shows an exemplary system architecture diagram for a wireless name system (WNS) 100 where one or more embodiments of the present disclosure may operate. The diagram illustrates the acquisition of one or more network information strings from one or more connected or unconnected wireless enabled devices (WED) 108 or 110, respectively, for storing and retrieving associated content, according to various embodiments.

Wireless name system 100 may include a registry 102; an application programming interface (API) 104 operatively coupled with an information string server 106 that provide a wireless signal data management platform that receives, stores, analyzes, presents and acts upon information based on wireless signals detected by the various WEDs 108. The platform may include one or more transceivers, memories, displays, communication applications, string utilization applications, processors, etc. as known to one of ordinary skill. In addition, hardware and software components of the platform may be co-located or distributed, physical or virtualized in various configurations to support its function. One or more connected WEDs 108 are operatively coupled with information string server 106 and API 104; and one or more unconnected WEDs 110 operatively coupled with connected WED 108.

Connected WED 108 may include a transceiver 112, a memory 114, a display 116, a communication application 118, a string utilization application 120, and a processor 122. By a way of illustration and not by way of limitation, connected WED 108 may include smartphones, tablets, laptops, desktop computers, routers, access points, Automated Teller Machines (ATM), Internet of Things (IoT) devices, among others. The communication application 118 may provide instructions to processor 122 to enable connected WED 108 to interact with one or more unconnected WEDs 110, or other connected WEDs 108.

Similarly, unconnected WEDs 110 may include a transceiver 124, a memory 126, a processor 128, a communication application 130, and a string utilization application 132. By a way of illustration and not by way of limitation, unconnected WEDs 110 may include smartphones, tablets, laptops, desktop computers, routers, access points, Automated Teller Machines (ATM), IoT devices, such as smart appliances, electronic toys, clothing or shoe apparel, vending machines, and the like. The communication application 130 may provide instructions to processor 128 to at least enable unconnected WEDs 110 to transmit a beacon message 134. Unconnected WEDs 110 and connected WEDs 108 may also include a display (not shown).

Wireless signals 134 may include a network information string that can be associated with content stored in registry 102 or elsewhere. Specifically, the network information string may be associated with content stored in a wireless name associator WNA 136, while the network information string may be stored in a wireless name system WNS 138. The network information string stored in WNS 138 may include all or a portion of a SSID of a Wi-Fi network, and/or the MAC address broadcast by one or more unconnected WEDs 110 or other connected WEDs 108 (not shown), as well as other information relative to the WEDs and associated networks and devices. Content stored in WNA 136 may include pictures, videos, announcements, menus, news alerts, directions or links associated with the network information string stored in WNS 138. Both, WNA 136 and WNS 138, can be part of the ownership module 140 of registry 102 which can be accessed or managed by a user of the wireless name system 100.

Connected WEDs 108 may receive one or more wireless signals 134 broadcast from one or more unconnected WEDs 110 or other connected WEDs 108 (not shown). String utilization application 120 in connected WED 108 may check for content stored in memory 114 that may be associated to the network information string in beacon message 134. If the content is not found in memory 114, connected WED 108 may send a query 142 for content retrieval to information string server 106 via a wired or wireless link. Alternatively, connected WED 108 may send query 142 for content retrieval without first examining the network information string. Query 142 may include a request for authenticating or identifying one or more connected or unconnected WEDs 108/110, and/or for obtaining associated content of such WEDs 108/110.

According to an embodiment, information string server 106 may process one or more queries 142 through API 104. API 104 may manage the operation of information string server 106 and its interaction with registry 102. API 104 may be implemented using high-volume programming languages for processing numerous queries 142 at the same time. By a way of illustration and not by way of limitation, high-volume programming languages may include Erland and Cassandra, among others. Information string server 106 may be physically separated from registry 102. Alternatively, registry 102 may be integrated with information string server 106.

API 104 may include different modules for processing one or more queries 142 for content retrieval. For example, API 104 may process query 142 based on the wireless name 144 or SSID and MAC address 146 included in the network information string. In another embodiment, API 104 may process query 142 based on the content 150 and content type 148 that may be returned to connected WED 108.

In an embodiment, API 104 may perform a check 152 of the SSID and/or MAC address included in the network information string transmitted through beacon message 134. Specifically, API 104 may check 152 the SSID and MAC address included in the network information string against a list of SSIDs and MAC addresses stored in WNS 138. If the SSID and/or the MAC address in network information string are stored or were previously enrolled in WNS 138, then API 104 may check 152 for content in WNA 136 associated with the SSID and/or MAC address transmitted by unconnected WEDs 110 or other connected WEDs 108. API 104 may retrieve 154 associated content from WNS 138 and may output 156 this content back to connected WED 108. The content returned to connected WED 108 may provide information such as videos, pictures, messages, or links related to other connected or unconnected WEDs 108/110. This content may also include information related to the specifications of the WED broadcasting the beacon message 134. For example, based on content received from API 104, connected WED 108 may determine that unconnected WEDs 110 is smart TV and may obtain further information about its characteristics, performance, cost, and/or sale locations, among others. In another embodiment, API 104 may respond with content related to one or more unconnected WEDs 110, or one or more connected WEDs 108 (not shown) in proximity to connected WED 108.

During this operation, information about queries 142 for content retrieval and output 156 may be stored in the form of API logs 158 in a log datastore 160. Log datastore 160 may be included in registry 102, but may not be part of the ownership module 140, meaning that the data logged in log datastore 160 may not be directly controlled by a user of wireless name system 100. API logs 158 about queries 142 and output 156 may include identifying information of one or more unconnected WEDs 110; or one or more connected WEDs 108; identifying information of the user of the wireless name system 100 or connected WED 108; a list of MAC addresses and/or SSIDs embedded in detected network information strings; time and date when the query 142 or output 156 was made; content and/or content type queried or returned; and the location of connected WED 108 and/or unconnected WEDs 110 when the query 142 for content retrieval was made.

In an embodiment, the API logs 158 captured in log datastore 160 may allow the identification of patterns of action of one or more connected WEDs 108, or one or more unconnected WEDs 110, or their respective users. In another embodiment, API logs 158 captured in log datastore 160 may identify user preferences, determine the response of user of connected WED 108 to the content associated with the network information string, and measure the interest of the user of connected WED 108 in types of content. Yet in another embodiment, API logs 158 captured in log datastore 160 may allow the association of one or more connected WEDs 108 or one or more unconnected WEDs 110 to one or more patterns of action without requiring registration at the WNS 138. By a way of illustration and not by way of limitation, patterns of action may include movement or behavior patterns based on location logs for connected WEDs 108 or unconnected WEDs 110, shopping or consumer tendencies, among others. The utilization of API logs 158 in log datastore 160 may be managed by API 104 according to the application.

In various embodiments, the system 100 may employ pattern awareness for individual connected and unconnected WEDs 108/110, as well as groups of connected and unconnected WEDs 108/110, to take action based on information derived from the detected wireless signals. For example, the individual and group WED patterns may be used to determine that a WED belongs to a cohort, i.e., group, that has been granted permission to access a plurality of devices such as computers, servers, ATMs, and electronic safe locks among other devices. Pattern awareness may also be employed to make determinations concerning locations, for example, by determining whether a given WED belongs to a cohort that has been or should be granted permission to access sites such as a house, stores, and restricted areas among others. For example, a user of a connected WED that may be registered in the WNS may configure its account to only grant access to a computer or the gates of a house by associating more than two wireless signals under its SSIDs. In other words, the computer or the wireless sensor of the gates may only open if more than two signals previously associated to its SSID are detected together.

A group of wireless signals may be checked in an API and registered as one group which may then receive a meaning. The meaning of a group may vary according to the pattern it may form. As with individual WEDs, the pattern of groups of WEDs may vary over time maintaining or dissipating the patterns. For example, when a WED user changes work locations, various patterns associated with the individual WED and the work group of WEDs may dissipate over time and new patterns may emerge, while other existing patterns persist, such as those patterns and groups associated with the user's residence. Various actions that may be undertaken based on the patterns may be implemented or ceased as the patterns change under automated or manual control of the user.

Figure 2:
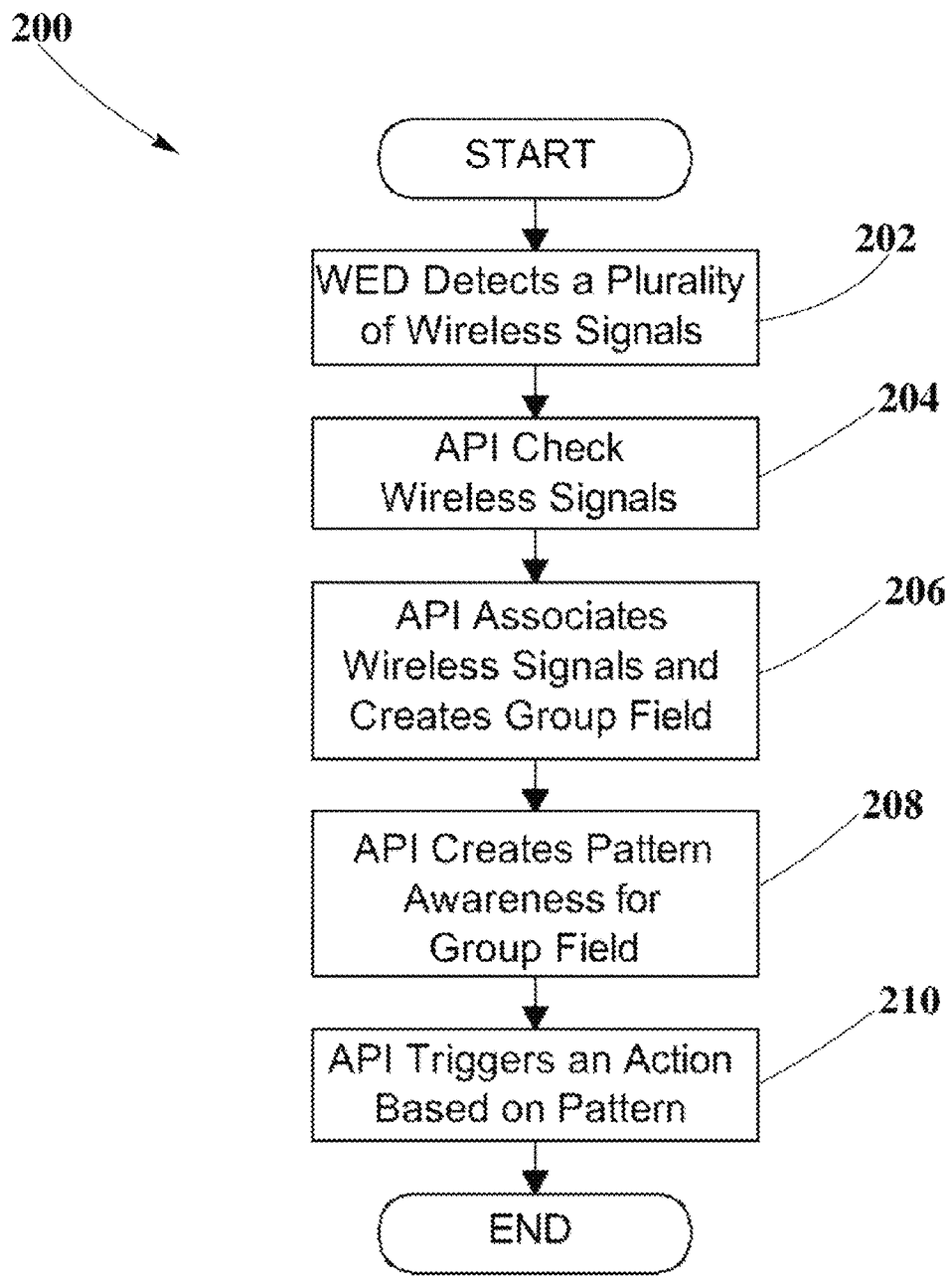
FIG. 2 illustrates a flowchart of methods for using a wireless name system to create pattern awareness of WEDs by giving meaning to a group.

FIG. 2 illustrates a flowchart of methods 200 for using a wireless name system to create pattern awareness for individual and groups of WEDs 108/110. The method described in the present disclosure may employ a wireless name system which may include a registry; an application programming interface (API) operatively coupled with an information string server; a least one connected WED operatively coupled with information string server and API; and one or more unconnected WEDs 110 operatively coupled with connected WED 108.

Connected WED 108 may include a transceiver, a memory, a display, a communication application, a string utilization application, and a processor and serve as a wireless signal detector for the system 100. By a way of illustration and not by way of limitation, connected WED 108 may include cell phones, smartphones, access points, tablet computers, desktop computers, banking terminals, cash register and the like. The communication application may provide instructions to processor to enable connected WED 108 to interact with one or more unconnected WEDs 110, or other connected WEDs 108.

The method may start at step 202 when a connected WED 108, acting as a wireless signal detector, detects a plurality of wireless signals such as Wi-Fi, Bluetooth and any other type of wireless signal at a certain location. In various embodiments, connected WED 108 may be a wireless signal detector, such a wireless router, access point, or the like, and it may be placed at different locations such as retail locations, airports, train stations, bus stations, amusement parks, shopping malls, and museums among others. Connected WEDs 108 may communicate information from the detected signals to the server 106, which receives and checks the wireless signals through an API to become aware of what those signals may be, at step 204. The API may then associate those wireless signals and create a group field in the WNS for said wireless signals and assign a meaning to that specific group, at step 206. Subsequently, API may create a pattern awareness for the specific group created in the group field, at step 208. The pattern may be based on a plurality of parameters such as the behavior of that specific group. For example, that group of signals may move around together creating a pattern that may have a meaning, such as group of tourists moving around a city. Finally, the API may trigger an action or get content based on the pattern created for that specific group, at step 210. For instance, API may trigger an action for a group of tourists visiting a museum by automatically downloading and installing an app in their phones that may allow the tourists to see digital content from the museum.

Figure 3:
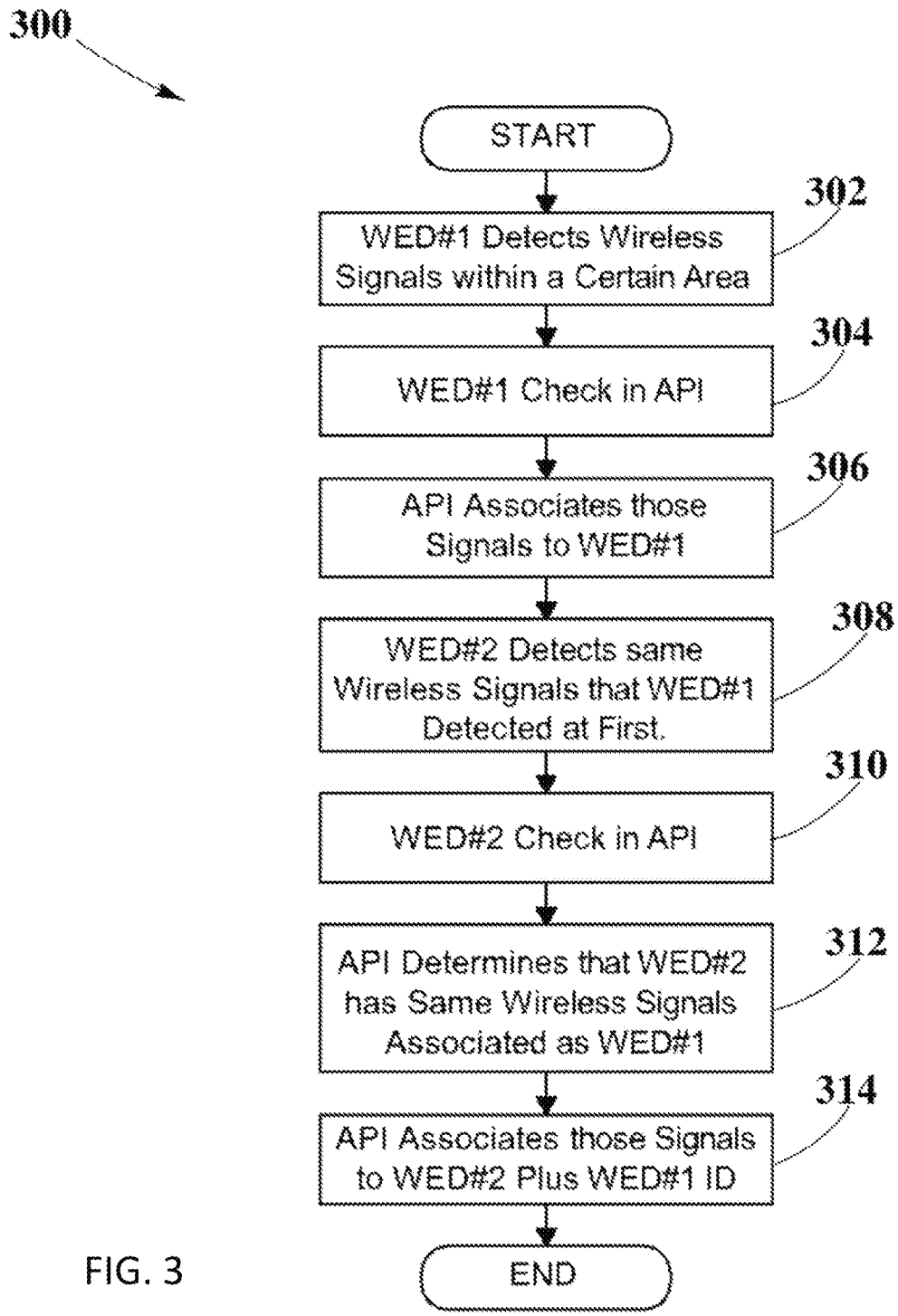
FIG. 3 illustrates a flowchart of methods for using a wireless name system in proximal deduction of WEDs.

FIG. 3 illustrates a flowchart of methods 300 for using a wireless name system in proximal deduction of WEDs 108/110 in an anonymous fashion. The method described in the present disclosure may employ a wireless name system which may include a registry; an application programming interface (API) operatively coupled with an information string server; a least one connected WED acting as a wireless signal detector operatively coupled with information string server and API; and one or more connected or unconnected WEDs 108/110 operatively coupled with connected WED 108.

Connected WED 108 may include a transceiver, a memory, a display, a communication application, a string utilization application, and a processor. By a way of illustration and not by way of limitation, connected WED 108 may include cell phones, smartphones, access points, tablet computers, desktop computers, banking terminals, cash register, IoT devices, and the like. The communication application may provide instructions to processor to enable connected WED 108 to interact with one or more unconnected WEDs 110, or other connected WEDs 108.

The method may start at step 302 when a connected WED #1 detects a plurality of wireless signals such as Wi-Fi, Bluetooth and any other type of wireless signal within a certain area, such as a retail location. In one embodiment, connected WED #1 may be a registered user of the WNS and may have configured its account to be discoverable to other users. In another embodiment, connected WED #1 may have configured its account to not be discoverable. Connected WED #1 may then check in an API, at step 304. Subsequently, API may associate those wireless signals to WED #1, at step 306.

Later, a connected WED #2 that may be within the same area of WED #1 may also detect the same wireless signals detected by WED #1, at step 308. In one embodiment, connected WED #2 may be a registered user of WNS and may have configured its account to be discoverable to other users. In another embodiment, connected WED #2 may have configured its account to not be discoverable. Connected WED #2 may then check in API, at step 310 with wireless signals detected. API may then determine that WED #2 may have same wireless signals associated to WED #1, at step 312. Finally, at step 314, API may associate the same wireless signals detected by WED #1 to WED #2 plus WED #1 SSID, if set discoverable. In some embodiments, the method may be applied for a plurality of users detecting the same wireless signals within the same location, as long as said users are on discoverable mode in their respective accounts.

Methods of the present invention may be implemented across a wide range of activities as may be envisioned by one of ordinary skill in those activities. The specific actions undertaken by the system 100 will likely depend upon the specific application of the invention as will be evident from the following examples.

In example #1, a wireless name system is used to create a pattern of wireless awareness of a group of WEDs 108/110, In this example, a connected WED such as a wireless signal detector may be placed at the gates of an airport terminal. When a flight lands, the wireless signal detector may detect all the MAC addresses or other wireless identifiers, such as AdIDs, etc. and other available settings of the WEDs 108/110 carried on the plane and create a group field in an API for said WEDs 108/110. The API may assign a meaning to the group and provide information to the group at the airport, such as baggage or flight information, or outside the airport.

In example #2, a wireless name system is used to create a pattern of wireless awareness of one WED or a group of WEDs 108/110. In these examples, a connected WED 108, such as a wireless signal detector, is used to control the opening of the garage door of a house. The wireless signal detector may learn a pattern created by the owner of the house and to only open the garage door when the system detects that pattern. For example, the pattern may be that two particular WEDs will be emitting wireless signals. Consequently, the owner of the house may need to have those two WEDs in his presence to trigger the garage opener to open the door, even if he knows a door opening code.

In example #3, the wireless name system 100 is used to create a pattern of wireless awareness of a group of WEDs 108/110. In one example, the owner of a wearable may use the pattern to restrict the use of the wearable unless the WEDs proximate to the wearable are consistent with the use pattern. In other example, a business owner may determine that customers of the business have a common criteria related to a particular brand, product, or service. The business owner may provide content, i.e., information, advertising/marketing, or other services directed toward that brand, product, or service, whether provided by the owner or a third party. The content or service may be provided to the user's WED or in a manner other than via the user's WED, such as in-store and third party store displays, social and traditional media, etc. that reach a broader audience.

In some instances, the business owner may use the common criteria to provide additional products and/or services to its customers. For example, the business owner may decide to develop an app for wearables, because the business owner finds the percentage of its customers that have the wearable to warrants the development.

Pattern awareness may also be used to identify inconsistencies with one or more user profiles and take various actions. For example, the system 100 may be configured to take one or more action if unknown or uncommon WEDs are identified, such as proximate to a house or other facility in the evening or other hours when not expected. Actions may include notifying the user and others, such as a security service, of the presence of unknown WEDs, storing the wireless identifier and information from the detected wireless signals, turning on lights, etc.

In various embodiments, a WNS 100 may be used in proximal deduction of WEDs 108/110 in an anonymous fashion. For example, a connected WED #1 detects a plurality of wireless signals such as Wi-Fi, Bluetooth®, and any other types of wireless signal within a certain area. In one embodiment, connected WED #1 may be a registered user of the WNS and may have configured its account to be discoverable to other users. In another embodiment, connected WED #1 may have configured its account to not be discoverable. Connected WED #1 may then check in an API. Subsequently, API may associate those wireless signals to WED #1. Later, a connected WED #2 that may be within the same area of WED #1 may also detect the same wireless signals detected by WED #1. In one embodiment, connected WED #2 may be a registered user of WNS and may have configured its account to be discoverable to other users. In another embodiment, connected WED #2 may have configured its account to not be discoverable. Connected WED #2 may then check in API with wireless signals detected. API may then determine that WED #2 may have same wireless signals associated to WED #1. Finally, API may associate the same wireless signals detected by WED #1 to WED #2 plus WED #1 SSID, if previously set in discoverable mode. In some embodiments, the method may be applied for a plurality of users detecting the same wireless signals within the same location, as long as said users are on discoverable mode in their respective accounts.

The system 100 may be employed as a Proximal Intelligence (PI) service to provide a complete picture of the signals around a WED over a period of time, as well as real time or near real time depending upon connection speeds and settings. This picture allows the system 100 to generate a signal ranking calculation for signals detected by users. Signal ranking takes into account criteria such as repeated/frequency of detection, number of access points, possible interference due to signal density and other factors to provide a more accurate assessment of potential connection quality.

The core PI components of the system 100 include:

A PI API for mobile WED 108/110, e.g., Android and iOS operating system versions, which runs in the background and preferably use very little battery power and data transmission capacity. It will be appreciated that the information that can be derived from each mobile WED 108/110 may depend upon the information provided by the particular operating system and the wireless technology in the WEDs 108/110.

A PI platform, e.g., registry 102, API 104, server 106, to receive, store, process, and communicate data from the various WEDs 108/110 with the various WEDs 108/110 and other platforms. It will be appreciated that while the PI platform may be implemented in many ways, it will most likely need to be capable of processing high signal volumes from millions of app installs without incurring performance issues.

Wireless signal observations by the WED 108/110 may be reported by a WED's unique Advertising Identifier (AdID) as system intelligence input, which may include:

WED 108/110 manufacturer information;
App name and version that made the observation;
date/time of observation;
other observed wireless signals around the WED 108/110 at time of observation (SSIDs, MAC addresses, and beacon IDs, from WiFi, Bluetooth, and Bluetooth LE devices);
latitudinal/longitudinal coordinates and IP address of WED 108/110, if available.

Using the data from the WEDs 108/110, the system 100 may calculate the wireless signals of interest for each WED 108/110 and store that information in a database along with information received from the WEDs 108/110. As noted above, the system 100 may maintain all of the data for at least a period of time even for WEDs encountered one time to support various activities. The database may also be augmented with third-party data sources to build as much intelligence on key wireless signals and the most robust results as possible as further described below.

The system 100 may provide a dashboard on a user interface (UI) that may be accessible locally or remotely via the connected WEDs 108 and other wirelessly and wired devices. API calls may include queries by AdID as well as across the entire group of app installation AdIDs. Data being output and stored by the system may include:

Raw SSID/MAC address data
Received Signal Strength Indicator (RSSI)
PI WiFi Proximity calculation—signal ranking (combines RSSI, signal set size—MAC/other, and temporal behavior)
WiFi Security and Connection status
WiFi Location classifier, e.g., home, work, etc.
Data Throughput/Latency statistics with time of day, and security info
Hotspot 2.0 status
Retail Brands classifier for most proximally relevant retailers (potential partners)
Wearable and BLE device proximity information when relevant Observations by the WEDs 108/110 may be provided to system 100 via HTTPS or other network options as are known. The system 100 may or may not include personally identifiable data associated with the WED 108/110. For example, the system may only hold the AdID and observed proximal signal data, but no personal data.

The system 100 may also report on volume and quality of data collected and confirm implementation results on particular WEDs 108/110. The UI, e.g., dashboard, may provide access to various types of reporting applications, such as audience segments, analysis and visualization tools, as well as the current status of the platform and the WEDs 108/110.

Figure 4:
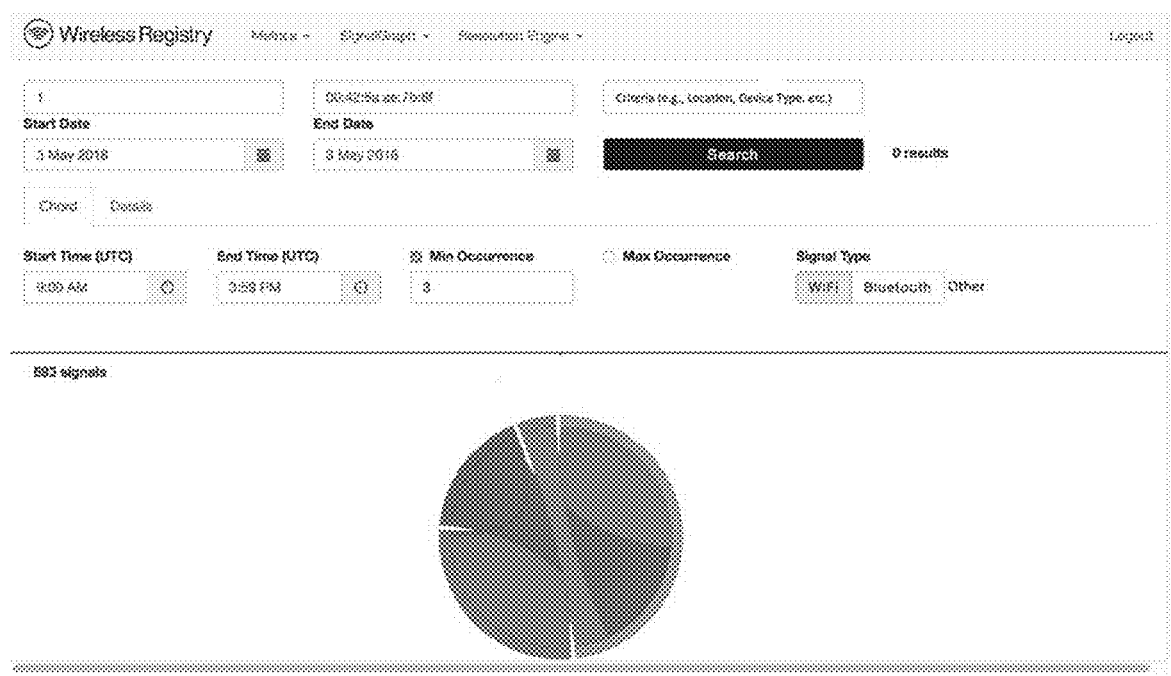
FIG. 4 illustrates exemplary user interfaces including analysis and graphic displays.

FIG. 4 shows an exemplary user interface (UI) of the system 100, in which a user may be able to visualize various relationships between WEDs of interest. The system 100 may learn the context and behavior of the signals observed by the WED 108/110, and additional optional functions may be added to the dashboard over time as desired by the system user. In various embodiments, dashboard and other UI functions may be accessible via the platform or on the WED 108/110 itself.

In various embodiments, the mobile application may be a small library file, which will likely have to be different for each operating system, since Android and iOS have different limitations. As such, the mobile application may retrieve different information from WEDs 108/110 having different operating systems, but process that information to a consistent format for reporting back to the management platform via the API, so the information may be used together.

For example, the API inbound call from a UI on a WED 108 or other networked device may specify a set of AdIDs and a time window. The data returned may be indexed in various ways by given AdIDs, aggregated over the given window, such as in FIG. 4. For example, as listed above, the data being output and stored may include:

Raw observation/detected data (processed through the mobile application): A time-series indexed stream showing (per time-point) all signals collected and their meta-data. The meta-data includes: RSSI, MAC address, SSID, latitude 85 longitude coordinates.

Signal ranking (RSSI, signal set size—mac/other, temporal behavior): The SR function analyses signal observation patterns and orders the signals detected in order of importance (Rank). Formally, SR: AdID→{(Sig, Rank)|Sig is an observed signal by the given AdID}. Intuitively, the rank may represent a measure of importance of a detected signal for the given WED 108/110. The platform takes as input the frequency of detection of an observed signal, the signal's weight in the database (constructed over all AdIDs), the proximity to the signal to the WED.

WiFi security and connection status: Observations include the connectivity status, reporting when a device is connected to a WiFi access point, allowing the system to determine networks that have an existing relationship the device, in addition to those in range.

WiFi location classifier: Observations of connections and regular observations over periods of time allow the system to understand when the device is in the home, work, and roaming (internet cafe or Amtrak, etc.) contexts—connected or not. As information is collected over a range of dates, the patterns that emerge are highly relevant and stable. The API can report on the location context for a given AdID at any time or on the signals that are relevant at these locations for the AdID.

Signal quality/latency: A discrete signal (latency) quality value may generated for access points that have a significant presence across observations. Calculations depend on the RSSI information, the number of MACs present for a signal, the presence (interference) of other signals, and number of other reporters detecting the same patterns. It may be desirable to perform 3rd party speed test applications which can provide speed test results for 100s of millions of WiFi access points. The speed test information may be useful to evaluate impact of latency introduced by various data collection paths.

Hotspot 2.0: Where Hotspot 2.0 attributes are detected via direct observation by the WED app or via 3rd party data providers, it can be made available in API results.

Retail brands associated to the WED, as identified by advertising identifier (AdID), MAC address, or other unique identifier: Signal observations over time provide insight into the retail locations with which the WED has significant relationships. The API 104 may provide the most significant brands associated to each AdID based on proximal observations received from WEDs 108 and stored in the registry 102. This information may provide clear identifications of the retailers, hotels, gas stations, restaurant chains, etc. that are frequently in range of the WED 108/110. The brands reported will be those with significant access point infrastructure that the user has significant contact with over time and may represent potential future connectivity partners.

Wearables and BLE device information: The database may also include BLE devices that are associated with a WED. This includes the brand of car the user drives, wearables the user connects to, Bluetooth beacons the user detects regularly, etc.

The system may provide either push or pull (API) interactions. For the push variant, the platform may include a secure storage address where the processed data can be stored. For the pull variant, the system will issue API calls specifying a batch of AdIDs.

The system 100 provides wireless device proximity cloud for WEDs 108/110 observing signals in the system 100. In addition, the aggregation of data from multiple WEDs 108/110 enables a single, indexed, and searchable platform of the world's wireless things based on proximity to various WEDs 108/110.

The system may provide various type of insights based on the data that may be of high value to various markets, such as Industrial facilities and smart cities—How is my large-scale deployment of wireless devices interacting?

Marketing, brands, and advertising—Which smart devices do consumers encounter and own?

Markets, finance and investment—How many new wearables were sold this quarter?

As data is received by the platform from various WEDs 108/110, the observed WEDs 108/110 can be characterized into classes and ranked according to frequency. The frequency of observation may be used to describe the wireless device cloud, which is unique to the WED user in terms of various categories, such as consumer electronic, e.g., wearables, vehicles, frequented retailers, travel destinations, etc.

FIG. 5 depicts exemplary scenarios of a user of a WED 108/110 commuting between two points, such as home and work. The user may encounter various types of unconnected and connected WEDs 110/108 including wireless signal detectors along the commuting path. If the user's WED is connected, the WED 108 may provide wireless identifiers and other information derived from wireless signals detected by the user's WED 108 including date, time, and location, if available. In addition, other connected WEDs 108 along the commuting path that detect the user's WED, whether connected to the system 100 or not, and may report detecting wireless signals from the user's WED 108/110 along with information derived from the wireless signals as previously discussed.

The system 100 may provide proximal signal observation of various wireless devices in the WED cloud around each WED 108/110 with direct observation of other WEDs 108/110 that are persistently nearby the WED 108/110, such as automotive, wearable, smart-home WEDs 108/110. The proximal context may be tracked over time to provide a holistic profile on a new dataset, that of proximate wireless signals and WEDs. In addition to the cloud of WEDs 108/110 proximate an observing WED 108/110, the information from one or more WEDs 108/110 can be accumulated to interrogate various types of devices that are observed on a type by type basis.

In various embodiments, real-world consumer trends, device, wearable, smart-home and car ownership, and more may be extracted from the data to provide visibility into lifestyle and brand affinities based on an entirely new dataset of the things. In addition to providing insights on the IoT cloud of WEDs 108/110 encountered by an observing WED 108/110, information about various WEDs 108/110 that exist at workplaces and socially may be surmised based on observations of wireless signals emitted by electronics and appliances at home, cars, devices at work and in the office, wearables and gadgets friends and coworkers carry, wireless infrastructure encountered in stores and venues. Wireless signal observations may also be used for security, e.g., unknown WEDs, etc., and a wide variety of business and personal actions as will be appreciated by one of ordinary skill in the relevant art.

For an individual WED 108/110, the various signal observations may be categorized and catalogued into places, devices, locations, and other categories based on the data collected and stored in the registry 102 and in some embodiments maintained at least in part in the WED 108. For example, data collected over a period of time may identify various WEDs 108/110 as being associated with the home, office, and other places visited by the individual WED 108/110 user as well as others. The data may include geolocation data to more precisely identify a location via the individual WED or via location information from the various other WEDs 108/110 that interact with the individual WED 108/110. In addition, the individual WED 108/110 may or may not have personally identifiable information associated with the data.

Even in the absence of specific location data, the system 100 may provide WED profiles that may be useful for performing various actions. For example, WEDs 108/110 observed by the individual WED 108/110 at night over time may be associated with the home of the individual WED user. A similar assumption may be made for a work location. As previously mentioned, some WEDs may be associated with physical locations, such as retail locations.

Various actions may be executed in whole or part by the system 100 based on the profiles, either automatically or with some level of user interaction. For example, the system 100 may identify a pattern associated with one or more WEDs 108 that may be useful for automatically unlocking a computer in the presence of those WEDs 108/110. The system 100 may be configured to prompt the user to implement various actions based on patterns observed by the system 100.

A catalog/taxonomy may be provided by mapping the data using various rules and processes to segment data into groups and subgroups representing a plurality of profiles attributable to each group and subgroup. In some embodiments, the profiles may be based on 1) number of WEDs encountered at various locations (e.g., home, office, etc.), 2) WEDs regularly associated with a WED user (i.e., carried by WED user, such as wearables, tablets, smartphones, laptops), 3) types of WEDs, 4) locations frequented by the WED, etc. The profiles may be used by the system 100 and/or users to take various actions alone or in combination with WEDs 108 or other systems as described herein and know to those of skill in the various arts.

In various embodiments, the system 100 may be employed to identify previously unknown relationships by defining relationship thresholds for the segmentation of the data. The thresholds for identifying common criteria may be set by the user or the system. For example, retail establishments may be interested in knowing when a certain percentage of their customers share one or more common criteria or attributes, such as owning a wearable, specific brands of WEDs, or wirelessly equipped vehicles, etc. From these common criteria, shared interest groups may be identified and used for various purposes, such as cross-marketing, etc.

In various embodiments, the system 100 may be configured to analyze and provide automated segmentation of the information categorized from the WED 108/110 in various groups and subgroup based common criteria identified by the system 100 and/or the users. For example, retail users of the system 100 may wish to identify the most common criteria or attribute, or top 10, etc., associated with the WEDs detected by the system 100. The common criteria may be tracked as a function of time to reveal tendencies, such as behavioral changes, in the customer base.

Co-marketing campaigns may be dynamically adjusted to present advertising that is tailored to WEDs 108/110 that are detected by the wireless signal detector physically present in the retail location or elsewhere as a function of time. For example, a first retail user may find that WEDs 108/110 visiting their location may often visit a second retailer before or after visiting their location. In a co-marketing campaign, the first retailer may deliver advertising from the second retailer to the WED. In a competitive scenario, the first retailer may vary its offering to capture business from the WED user that might have gone to the second retailer. In various embodiments, users of the system 10 may also facilitate analysis of and decision-making based upon consumers' inferred preferences, brand affiliations, interests, and habits, for a variety of uses including advertising uses. The system may enable users to present advertising to WED users via their WED or any other traditional advertising mechanisms, such as in-store and third party displays based on the WED user's preference determined by the common criteria.

In various embodiments, users of the system 100 may be able to visualize their customer activities in various manners. For example, customer activity may be viewed as a function of time with common criteria being identified from the information categorized as a function of time during the day. Similarly, individuals, businesses, groups, etc. may analyze their cloud to determine various actions that the system 100 may enable during the course of a day.

While various aspects and embodiments have been disclosed, other aspects and embodiments are contemplated. The various aspects and embodiments disclosed are for purposes of illustration and are not intended to be limiting, with the true scope and spirit being indicated by the following claims.

The exemplary embodiments can include one or more computer programs that embody the functions described herein and illustrated in the appended diagrams. However, it should be apparent that there could be many different ways of implementing aspects of the exemplary embodiments in computer programming, and these aspects should not be construed as limited to one set of computer instructions. Further, those skilled in the art will appreciate that one or more acts described herein may be performed by hardware, software, or a combination thereof, as may be embodied in one or more computing systems.

The functionality described herein can be implemented by numerous modules or components that can perform one or multiple functions. Each module or component can be executed by a computer, such as a server, having a non-transitory computer-readable medium and processor. In one alternative, multiple computers may be necessary to implement the functionality of one module or component.

Unless specifically stated otherwise as apparent from the following discussion, it is appreciated that throughout the description, discussions utilizing terms such as "detecting" or "connecting" or "sending" or "determining" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, smartphone, personal digital assistant (PDA), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described above are intended to be exemplary. One skilled in the art recognizes that numerous alternative components and embodiments that may be substituted for the particular examples described herein and still fall within the scope of the invention.

What is claimed is:

1. A system comprising:
    a wireless signal detector;
    at least one memory; and
    at least one processor to
        receive wireless identifiers and information associated with one or more wireless enabled devices (WED) from wireless signals detected by the wireless signal detector;
        identify a device type for each of the WEDs;
        add the device type to the information associated with the WEDs;
        store, in the at least one memory, the wireless identifiers and information associated with each of the WEDs and the wireless signal detector;
        categorize each of the WEDs and the wireless signal detector based on the information; and,
        identify common criteria among the categorized information from the one or more WEDs and the wireless signal detector;
        segment the one or more WEDs and the wireless signal detector into groups based on the common criteria; and,
        perform at least one action related to the segmented WEDs based on the common criteria, wherein the at least one action includes at least one of:
            presenting advertising on displays proximate to the WEDs based on the categorized information for at least one of the WEDs,
            granting access to at least one of a device and a site based on a pattern of use of the WED,
            notifying a user of the system when receiving a wireless identifier of an unknown WED,
            storing the segmented group of WEDs and the common criteria;
            turning on lights when receiving a wireless identifier of a known WED, and
            displaying the information from at least one of the WEDs detected by wireless signal detectors.

2. The system of claim 1 where the at least one processor identifies common criteria that include at least one of frequency of detection for each of the WEDs by the wireless signal detector, identified device types detected, locations frequented by the WEDs, geolocation data, and time of day.

3. The system of claim 1 where the processor further presents content to a user of one of the WEDs based on the common criteria.

4. The system of claim 3 where the content is marketing content.

5. The system of claim 1, further comprising a user interface, where the processor enables a user, via the user interface to take action based on information derived from the WEDs detected by wireless signal detectors.

6. The system of claim 1, where the wireless signal detector is a WED including at least one of smartphones, tablets, laptops, desktop computers, routers, access points, Automated Teller Machines (ATM), and Internet of Things (IoT) devices.

7. A method comprising:
- receiving, by a wireless signal detector, wireless identifiers and information associated with one or more WEDs from wireless signals detected by a wireless signal detector;
- providing, from the wireless signal detector to a processor, the wireless identifiers and information associated with one or more WEDs;
- identifying, by the processor, a device type for each of the WEDs;
- adding, by the processor, the device type to the information associated with the WEDs;
- storing, by the processor, the wireless identifiers and information associated with each of the WEDs and a wireless identifier for the wireless signal detector;
- categorizing, by the processor, each of the WEDs and the wireless signal detector based on the information;
- identifying, by the processor, common criteria among the categorized information from the one or more WEDs and the wireless signal detector;
- segmenting, by the processor, the one or more WEDs and the wireless signal detector into groups based on the common criteria; and,
- performing, by the processor, at least one action related to the segmented WEDs based on the common criteria, wherein the at least one action includes at least one of:
  - presenting advertising on displays proximate to the WEDs based on the categorized information for at least one of the WEDs,
  - granting access to at least one of a device and a site based on a pattern of use of the WED,
  - notifying a user of the system when receiving a wireless identifier of an unknown WED,
  - storing the segmented group of WEDs and the common criteria;
  - turning on lights when receiving a wireless identifier of a known WED, and
  - displaying the information from at least one of the WEDs detected by wireless signal detectors.

8. The method of claim 7 where common criteria includes at least one of frequency of detection for each of the WEDs by the wireless signal detector, identified device types detected, retail locations frequented by the WEDs, geolocation data, and time of day.

9. The method of claim 7 where performing at least one action includes developing a wireless device profile for at least one WED based on a frequency of detection of various WEDs alone and in combination.

10. The method of claim 7 where performing at least one action includes presenting at least one of content and services to a user of one of the WEDs based on the common criteria.

11. The method of claim 10 where the at least one of content and services is presented to the user in a manner other than via the user's WED.

12. The method of claim 7 where performing at least one action includes providing a user with a user interface to analyze and visual display the information from WEDs detected by wireless signal detectors owned by the user.

13. The method of claim 7 where the wireless signal detector is a connected WED including at least one of smartphones, tablets, laptops, desktop computers, routers, access points, Automated Teller Machines (ATM), and Internet of Things (IoT) devices.

14. The method of claim 7, where the information includes information about each WED and wireless signal detector including at least one of wireless identifiers, type, location, connection status, time detected, other detected WEDs, detected wireless signal strength, network identifier.

15. A non-transitory computer readable medium storing instructions, the instructions comprising:
- one or more instructions which, when executed by one or more processors, cause the one or more processors to:
  - receive wireless identifiers and information associated with one or more WEDs from wireless signals detected by a wireless signal detector;
  - identify a device type for each of the WEDs;
  - add the device type to the information associated with the WEDs;
  - store, in the at least one memory, the wireless identifiers and information associated with each of the WEDs and the wireless signal detector;
  - categorize each of the WEDs and the wireless signal detector based on the information; and,
  - identify common criteria among the categorized information from the one or more WEDs and the wireless signal detector;
  - segment the one or more WEDs and the wireless signal detector into groups based on the common criteria; and,
  - perform at least one action related to the segmented WEDs based on the common criteria, wherein the at least one action includes at least one of:
    - present advertising on displays proximate to the WEDs based on the categorized information for at least one of the WEDs,
    - grant access to at least one of a device and a site based on a pattern of use of the WED,
    - notify a user of the system when receiving a wireless identifier of an unknown WED,
    - storing the segmented group of WEDs and the common criteria;
    - turn on lights when receiving a wireless identifier of a known WED, and
    - display the information from at least one of the WEDs detected by wireless signal detectors.

16. The non-transitory computer readable medium of claim 15, where the one or more instructions, that cause the one or more processors to identify common criteria, cause the one or more processors to:
- identify common criteria that include at least one of frequency of detection for each of the WEDs by the wireless signal detector, identified device types detected, retail locations frequented by the WEDs, geolocation data, and time of day.

17. The non-transitory computer readable medium of claim 15, where the one or more instructions that cause the one or more processors to perform at least one action common criteria, cause the one or more processors to:
- present advertising to a user of one of the WEDs based on the common criteria.

18. The non-transitory computer readable medium of claim 15, where the one or more instructions, when executed by the one or more processors, further cause the one or more processors to store demographic information determined based on the common criteria.

19. The non-transitory computer readable medium of claim 15, where the one or more instructions, when executed by the one or more processors, further cause the one or more processors to provide a user with a user interface to analyze and visual display the information from WEDs detected by wireless signal detectors owned by the user.

20. The non-transitory computer readable medium of claim 15, where the wireless signal detector is a WED including at least one of smartphones, tablets, laptops, desktop computers, routers, access points, Automated Teller Machines (ATM), and Internet of Things (IoT) devices.

* * * * *